No. 765,991. PATENTED JULY 26, 1904.
W. PICKARD.
NUT LOCK.
APPLICATION FILED NOV. 4, 1902.
NO MODEL.
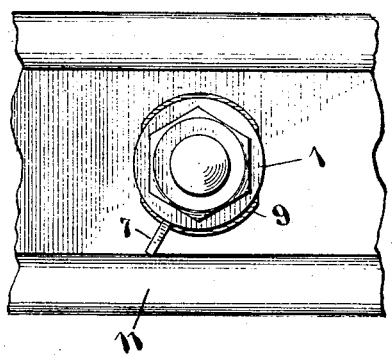
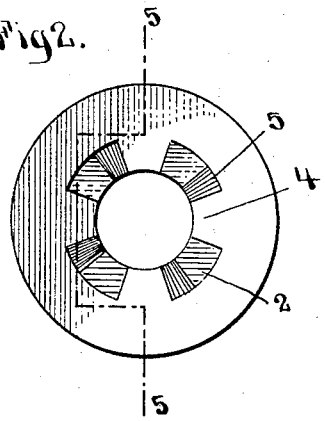 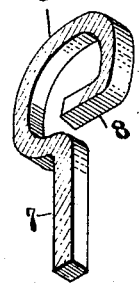 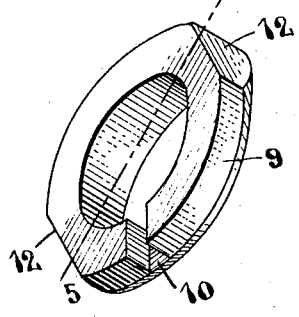
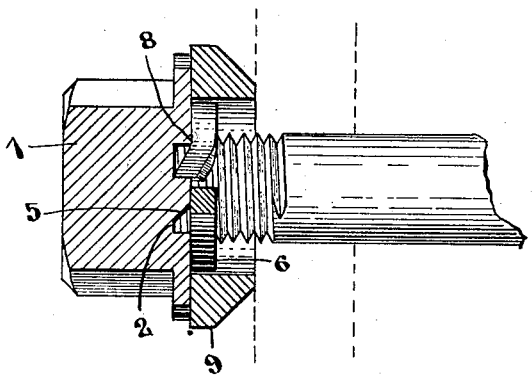
WITNESSES: INVENTOR:
Edw. W. Vaill Jr. William Pickard
Chas. K. Bennett by Isme Pettit
ATTORNEY No. 765,991. Patented July 26, 1904.

UNITED STATES PATENT OFFICE.

WILLIAM PICKARD, OF PHILADELPHIA, PENNSYLVANIA.

NUT-LOCK.

SPECIFICATION forming part of Letters Patent No. 765,991, dated July 26, 1904.

Application filed November 4, 1902. Serial No. 130,014. (No model.)

*To all whom it may concern:*

Be it known that I, WILLIAM PICKARD, a citizen of the United States, and a resident of the city of Philadelphia, State of Pennsylvania, have invented certain new and useful Improvements in Nut-Locks, of which the following is a full, clear, and complete disclosure.

Broadly, my invention consists in providing a nut for bolts, &c., with means for preventing the same from becoming loose or unscrewed, said means comprising a lock of the pawl-and-ratchet type, the construction of which will be hereinafter more particularly set forth.

For a full, clear, and exact disclosure of my invention reference may be had to the following specification and to the accompanying drawings, forming a part thereof, in which—

Figure 1 is an elevation of a portion of a rail such as is usually used on steam or electric roads, showing my improved nut-lock in use thereon. Fig. 2 is a bottom plan view of the nut portion of the nut-lock. Fig. 3 is a perspective view of the spring-pawl. Fig. 4 is a perspective view of the washer or ring which is adapted to carry the spring-pawl, and Fig. 5 is a sectional view taken substantially upon the lines 5 5 of Figs. 2 and 4.

My improved nut-lock consists, essentially, of three elements or parts, to wit: a ratchet portion, a pawl, and the pawl-carrying ring.

1 represents the nut, having upon its inner face a series of recesses or depressions 2, forming teeth or ratchet elements 4. These teeth are inclined upon one side toward the bottom of the recesses, as indicated at 5. The pawl portion comprises substantially a ring or circular portion 6, which does not form a closed figure, but which terminates at one end in the radial extension 7 and at its opposite end in a portion 8, bent slightly upward out of the plane of the ring. These parts form a spring-pawl, the end 8 of which is adapted to engage with the ratchet-teeth 4 when the parts are assembled, as shown in Fig. 5. This pawl is carried and held in position by means of a ring 9, which has a recess or notch 10 upon one side thereof into which the radial projection 7 of the spring-pawl is adapted to fit. When the parts are assembled, the inner surface of the nut 1 securely holds the projection 7 within the notch 10, and said projection extends outwardly therefrom and is adapted to engage some fixed portion of the object upon which the nut is being used, such as the flange 11 of a rail. This prevents the ring 9 and the pawl from turning while the nut is being screwed up or fixed in position. By having the circular portion of the spring-pawl 6 inclosed by the ring the spring-pawl is not only protected from outside interference, but also more readily takes up the wear between the parts, by reason of the fact that the same can contract to a greater or less degree. Also if it is attempted to unscrew the nut the expansion of the spring-pawl beyond a certain point is prevented by the ring and also prevented from being broken when any greater force is put upon the nut to attempt to unscrew the nut further. By having the circular portion of the pawl free to move within the ring the part which acts as a spring is thereby greatly lengthened and the strain upon the spring which would tend to bend or break the material is greatly lessened. As additional means to prevent the ring from turning I provide flat or plain portions 12, adapted to be engaged by a wrench and held therein while the nut 1 is being turned up.

It will be seen that when the parts are assembled, as shown in Fig. 5, the nut while being turned toward the right will bring the teeth 4 in the path of the projection 8 of the pawl, which passes over them without hindrance; but when the nut is in its final position said projection will abut against one of the square edges of the rachet-teeth and prevent the nut from turning or being turned in the opposite direction. Since the ring is thereafter prevented from turning by reason of the projection 7, any tendency of the nut to become loosened or unscrewed will be prevented. Said nut can be removed only by cutting off the projection 7 or removing the obstruction in the way thereof.

My improved lock-nut is adapted for use in any capacity where devices of similar construction are employed and is particularly adapted for use in making rail-joints and for attaching the connecting or fish plates thereof.

Having thus described my invention, what I claim as new, and desire to protect by Letters Patent of the United States, is—

1. A nut-lock comprising in combination, a nut having teeth on the inner face thereof, a ring or washer having an opening therein, and a spring-pawl within said ring having a projection extending through said opening and adapted to engage a fixed projection or stop, one end of said pawl being adapted to engage said teeth.

2. A nut-lock comprising in combination, a nut having ratchet-teeth on the inner face thereof, a ring or washer having a transverse opening, and an arc-shaped spring-pawl within said ring, having one end extended through said opening and adapted to engage a fixed projection or stop, the other end of said pawl being adapted to engage said teeth.

3. A lock-nut comprising in combination, a nut having ratchet-teeth on the inner face thereof, a ring or washer having a radial groove therein and a spring-pawl in the form of a split ring having a straight radial projection at one end thereof and an inclined projection at the other, said radial projection adapted to be retained in said groove and also adapted to prevent said ring from turning, substantially as described.

In witness whereof I have hereunto set my hand this 31st day of October, A. D. 1902.

WILLIAM PICKARD.

Witnesses:
EDW. W. VAILL, Jr.,
JOHN F. GRODY.